J. HUMBRECHT.
TELESCOPE WITH VARIABLE MAGNIFICATION.
APPLICATION FILED MAR. 22, 1912.
1,097,635.
Patented May 26, 1914.
2 SHEETS—SHEET 2.
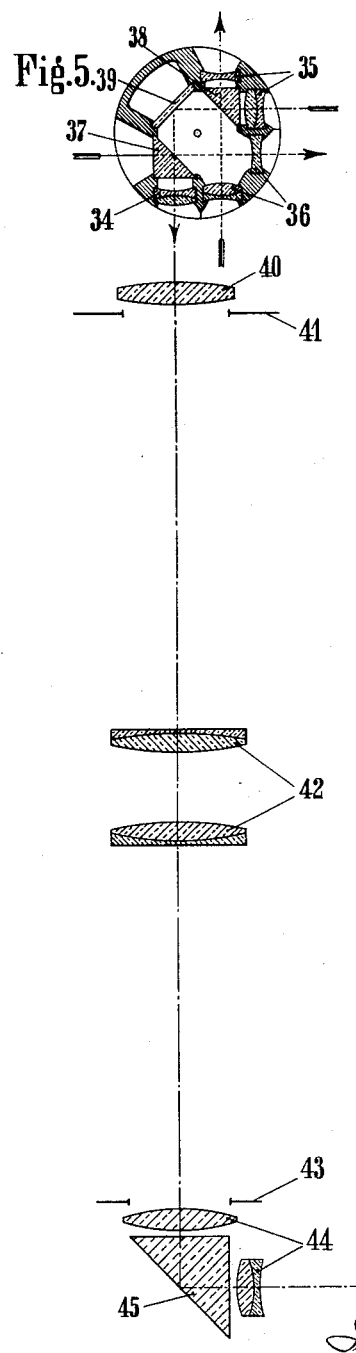

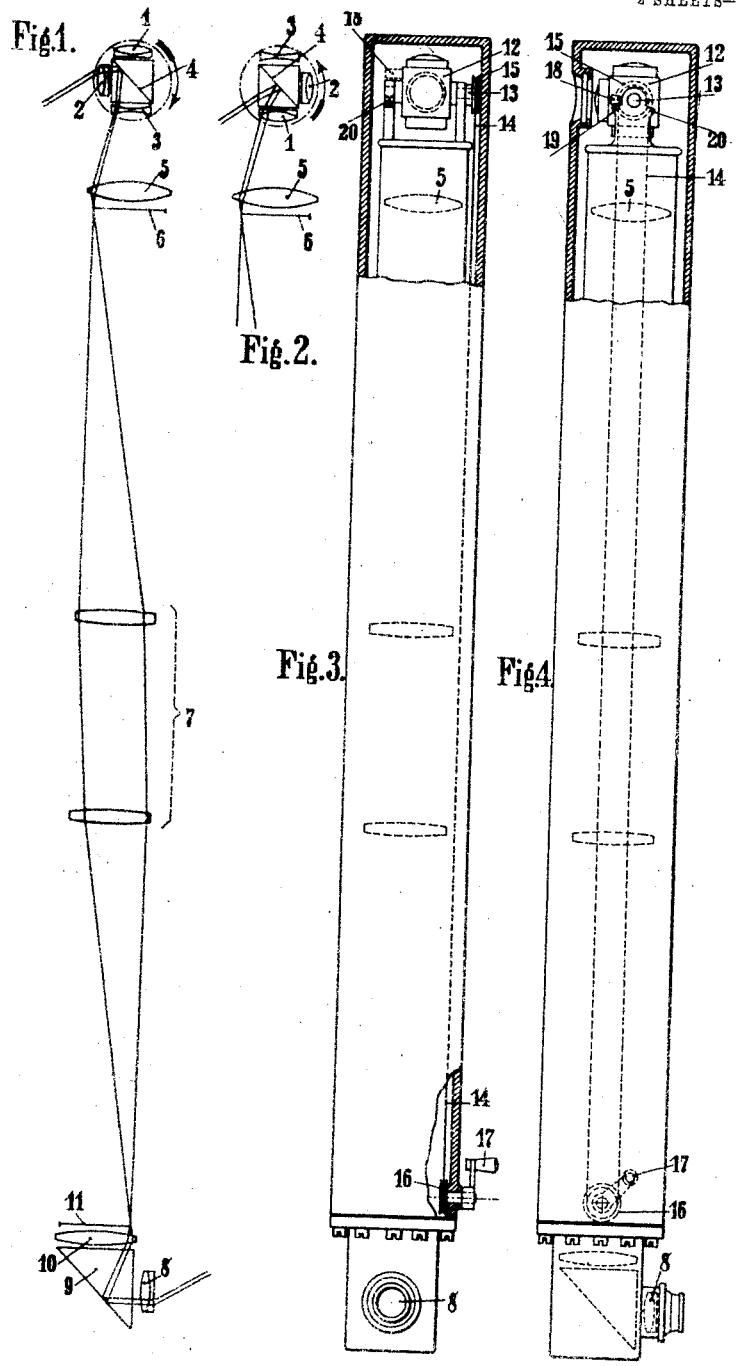

UNITED STATES PATENT OFFICE.

JULES HUMBRECHT, OF GROSS-LICHTERFELDE, NEAR BERLIN, GERMANY, ASSIGNOR TO THE FIRM OF OPTISCHE ANSTALT C. P. GOERZ AKTIENGESELLSCHAFT, OF FRIEDENAU, NEAR BERLIN, GERMANY.

TELESCOPE WITH VARIABLE MAGNIFICATION.

1,097,635.  Specification of Letters Patent.  Patented May 26, 1914.

Application filed March 22, 1912. Serial No. 685,403.

*To all whom it may concern:*

Be it known that I, JULES HUMBRECHT, a citizen of the German Empire, and resident of Gross-Lichterfelde, near Berlin, Germany, have invented certain new and useful Improvements in and Relating to Telescopes with Variable Magnification, of which the following is a specification.

This invention relates to a telescope with variable magnification provided with more than one objective and consists in the arrangement of the several objective systems in such a manner that same are rotatable about an axis perpendicular to the optical axis of the telescope and that between the objective lenses reflecting surfaces are provided parallel to the axis of rotation of the objectives; the focal lengths of the objectives and their distances from the coöperating reflectors being so calculated that the several objectives have the same image plane. This arrangement of the objectives and of the reflectors coöperating therewith results in an instrument wherein the ocular adjustment remains unchanged, whichever objective system is in use.

Two embodiments of telescopes in accordance with the invention are illustrated in the accompanying drawings in which—

Figure 1 diagrammatically illustrates the optical system of a periscope constructed according to the invention with two objective systems, Fig. 2 showing the two objective systems of the instrument in a position differing from that in Fig. 1. Figs. 3 and 4 are longitudinal sections, partly in elevation, showing one form of periscope, with the device for changing the position of the objective systems. Fig. 5 shows the optical system of a periscope with three objective systems in one rotatable carrier and a plurality of partly double sided reflectors.

Referring more particularly to Figs. 1 to 4 of the drawings 1 represents the objective with the smaller focal length, 2 the positive element and 3 the negative element of the objective with the greater focal length, 4 a surface reflective on both sides, 5 a collective lens and 6 the unvarying focal plane common to both objective systems when in working position; 7 is a reversing system of lenses, 9 an interposed reflector, 10 the collective lens of the ocular, and 11 the image plane of the ocular.

The passage of two rays belonging to a pencil of parallel rays entering the instrument is shown in Fig. 1. From Fig. 2 it will be seen that with the ocular systems arranged as shown in this figure, the rays passing through the objective 1 of shorter focal length are united in the same image plane 6 as the rays which pass through the objective 2, 3 of greater focal length with the adjustment as shown in Fig. 1. The adjustment of the objective systems as shown in Fig. 2 therefore gives a smaller magnification than that in Fig. 1. With the parts adjusted as shown in Fig. 1 the positive objective element 2 is in front of the reflector surface 4, whereas with the arrangement shown in Fig. 2, it is behind that surface. By the addition of the negative objective element 3, in the position shown in Fig. 1, the aggregate focal length of the objective 2, 3 is increased beyond the measure already attained by placing the positive element in front of the reflector surface 4.

As shown in Figs. 3 and 4 of the drawing the two objective systems, with the reflector belonging thereto, are mounted in a casing 12 rotatable about pivots 13. Rotation is imparted to the casing 12, by means of a cord 14, passing over a pulley 15 mounted on one of the pivots 13, and also over another pulley 16 near the ocular end of the instrument. Rotation of the pulley 16 is effected by means of a crank 17. 18 is a boss on the casing, arranged to abut against two fixed abutment surfaces 19, 20. According as the crank 17 is rotated in one or the other direction, till the boss 18 strikes one or the other of the abutments 19, 20, the objective 1 of shorter focal length or the objective 2, 3 of greater focal length comes into operation, so that the instrument is adjusted either for the smaller or the greater magnification.

In the embodiment of the invention represented in Fig. 5 in a carrier rotatable about an axis perpendicular to the optical axis of the instrument three objective systems 34, 35, 36 are mounted. 37 and 38 are prisms having each a surface inserted in the path of the rays reflecting on both sides; 39 is a reflector with one reflecting side. 40 is a condenser. 41 indicates the focal plane common to the three objective systems, 42 is a reversing system, 43 indicates the image plane of the angular ocular, 44 and 45 is a deviating prism inserted into the ocular.

The instrument allows three different magnifications depending from the special objective system which is brought into operative position. The minimum of magnification results from the operation of objective 34, the middling magnification from objective 35 and the maximum from objective 36; in the last case the rays are reflected after having passed the front element by each of the reflectors 38, 39, 37 before they reach the back element of the objective system.

What I claim is:—

1. A telescope with variable magnification, comprising a plurality of objective systems of different focal lengths rotatable about an axis perpendicular to the optical axis of the telescope, each system adjustable at will in the path of the rays coming from the object and having the same image plane, when in working position, and one or more reflectors parallel with the axis of rotation of the objectives.

2. A telescope with variable magnification comprising two objective systems of different focal lengths rotatable about an axis perpendicular to the optical axis of the instrument each system adjustable at will in the path of the rays coming from the object and having the same image plane when in working position and a reflector so positioned with relation to the objective systems that its plane is substantially parallel to the axis of rotation of the objective systems and that the objective of smaller focal length in working position is located behind the reflector whereas at least one element of the objective of greater focal length is in working position in front of a reflecting surface.

3. A telescope with variable magnification comprising two objective systems of different focal lengths rotatable about an axis perpendicular to the optical axis of the instrument each system adjustable at will in the path of the rays coming from the object and having the same image plane when in working position and a reflector so positioned with relation to the objective systems that its plane substantially coincides with the axis of rotation of the objective systems and that the objective of smaller focal length in working position is located behind the reflector whereas at least one element of the objective of greater focal length is in working position in front of a reflecting surface.

4. A telescope with variable magnification comprising two objective systems of different focal lengths rotatable about an axis perpendicular to the optical axis of the instrument and having the same image plane when in working position the system of greater focal length consisting of a positive element and a negative element at a distance from each other and a reflector so positioned with relation to the objective systems that its plane is substantially parallel to the axis of rotation of the objectives and that the objective of smaller focal length when in working position is behind the reflector whereas the positive element of the objective of greater focal length when in working position is in front of the reflector and the negative element of said objective behind it.

5. A telescope with variable magnification comprising a plurality of objectives of different focal lengths reflectors coöperating and in rigid connection therewith the objective and reflector structure rotatable about an axis substantially perpendicular to the optical axis of the instrument and parallel to the reflecting planes.

6. A telescope with variable magnification comprising two objectives of different focal lengths and a reflector having two reflecting surfaces, one for the one objective and the other for the other objective, said reflector and said objectives rigidly connected and rotatable collectively therewith the reflecting surfaces of the reflector substantially coinciding with the axis of rotation of the structure.

7. In a telescope a plurality of objectives, having different focal lengths and forming real images, and means for bringing the said objectives alternately into approximately the same operative locus without detaching them from the telescope casing, at least one of these objectives being composed of a collective member of greater and dispersive member of smaller focal length.

8. In a telescope a plurality of objectives having different focal lengths and forming real images, and means for bringing the said objectives alternately into approximately the same operative locus without detaching them from the telescope casing.

9. In a telescope a plurality of objectives having different focal lengths and forming real images, and means for bringing the said objectives alternately into approximately the same operative locus without detaching them from the telescope casing, at least one of these objectives being composed of a collective member and a dispersive member.

10. In a telescope, a plurality of objectives, of different focal lengths and reflecting means therefor, and a common movable mounting for said objectives and reflecting means, whereby the several objectives may be brought at will to the same operative locus.

In testimony whereof I have signed this specification in the presence of two subscribing witnesses.

JULES HUMBRECHT.

Witnesses:
HENRY HASPER,
WOLDEMAR HAUPT.

Copies of this patent may be obtained for five cents each, by addressing the "Commissioner of Patents, Washington, D. C."